H. A. SELAH.
ELECTRIC MOTOR FOR TALKING MACHINES.
APPLICATION FILED DEC. 7, 1915.

1,266,062.

Patented May 14, 1918.
2 SHEETS—SHEET 1.

H. A. Selah, Inventor
By Louis M. Sanders, Attorney

H. A. SELAH.
ELECTRIC MOTOR FOR TALKING MACHINES.
APPLICATION FILED DEC. 7, 1915.

1,266,062.

Patented May 14, 1918.
2 SHEETS—SHEET 2.

UNITED STATES PATENT OFFICE.

HOWARD A. SELAH, OF NEWARK, NEW JERSEY, ASSIGNOR, BY MESNE ASSIGNMENTS, TO ECLIPSE PHONOGRAPH CORPORATION, A CORPORATION OF DELAWARE.

ELECTRIC MOTOR FOR TALKING-MACHINES.

1,266,062.  Specification of Letters Patent.  Patented May 14, 1918.

Application filed December 7, 1915. Serial No. 65,457.

*To all whom it may concern:*

Be it known that I, HOWARD A. SELAH, a citizen of the United States, and residing in the city of Newark, county of Essex, and State of New Jersey, have invented certain new and useful Improvements in Electric Motors for Talking-Machines, of which the following is a specification.

In my prior application, Serial No. 50,148, I have described an improved direct current induction motor for operating the turntable of talking machines, wherein the field magnets were mounted upon a ring and their pole pieces located outside of the circumference of the turntable, which in itself formed the rotor part or induction armature of the motor. In another prior application, Ser. No. 60,473, I have shown a different form of speed regulator. In my present application I have made the motor itself as a separate and distinct element from the turntable, so that the turntable may be detached and replaced by one of a different size. The present invention also involves certain improvements in the means for regulations of speed, so that within certain limits the rate of rotation of the turntable may be accurately governed to correctly reproduce a sound record.

In the accompanying drawings forming a part of the specification—

Similar letters of reference refer to like parts throughout the specification and drawings.

Figure 1:
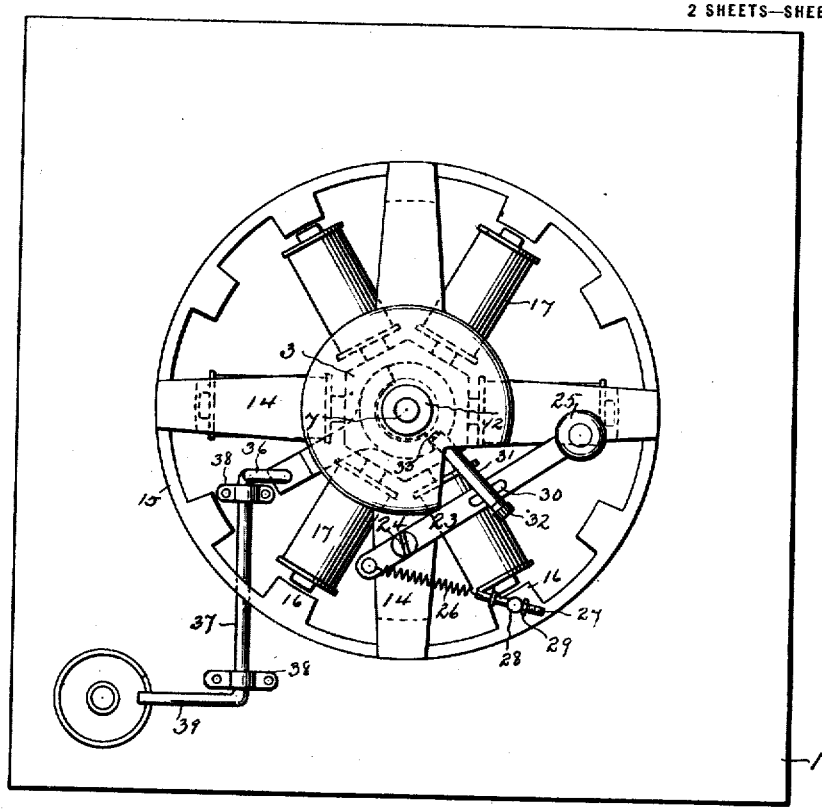
Figure 1, is a bottom plan view of the motor.

The motor board 1, is usually square, but may be made of the requisite dimensions to fit the cabinet. The board is centrally apertured as at 2, in which aperture is secured the metal supporting block 3, which latter is provided with a central aperture 4, terminating in an elongated sleeve bearing 5. This metal block is secured concentrically with the aperture 2, by means of a plurality of screws 6. Within the central aperture 4, and the sleeve bearing 5, is located the driving shaft or mandrel 7; this shaft has a shoulder bearing 8, which serves to support the mandrel 7 upon the socket bearing 9, in the upper side of the block 3. The upper cylindrical portion of the mandrel 7 is utilized as a support for the record tablet support 10. Rigidly secured to the lower exposed end of the mandrel 7, is the induction armature 11. This armature consists of a central hub 12, the cup-shaped central member 13, the radial arms or spokes 14, the ring 15, and the inwardly projecting teeth or pole pieces 16.

Figure 3:
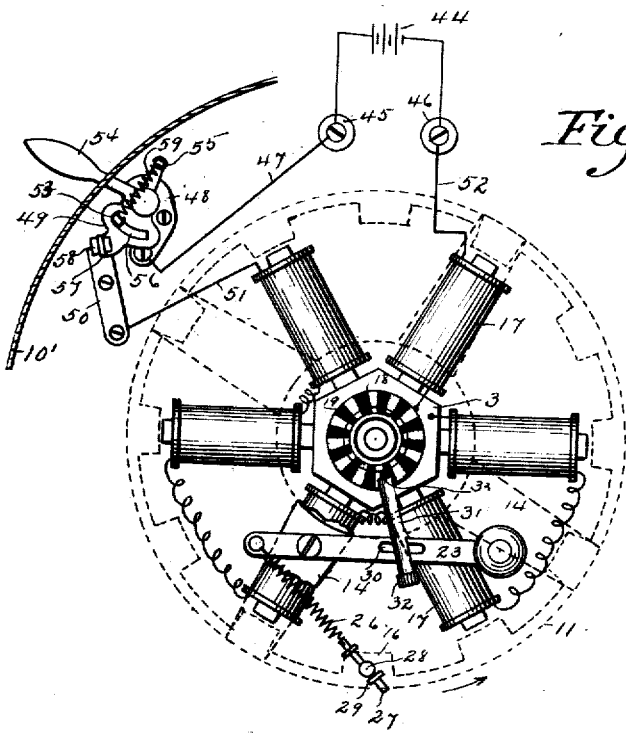
Fig. 3, is a wiring diagram.

As shown in Figs. 1 and 3, the central block 3 is hexagonal, and projecting radially from the hexagonal faces of this block are the field magnets 17, having the free ends of their cores extended in close proximity to the inner face of the pole pieces 16, as the latter, together with the ring 15, rotates with the shaft or mandrel 7. Mounted upon the sleeve portion 5, of the block 3, is the sliding circuit interrupter 18. This circuit interrupter is somewhat in the nature of a beveled gear with the spaces or grooves between the teeth filled with an insulating material as 19. The circuit interrupter is also insulated from the sleeve 5 by tubular insulation 20, so that it has no metallic connection with any part of the mechanism hitherto described.

As shown in Fig. 3, there are as many exposed metallic faces in this circuit interrupter as there are teeth 16 in the induction armature. The circuit interrupter 18 is held in its uppermost position by means of the spring 21, which latter surrounds the sleeve 5, and bears upon its lower end upon an insulating washer 22.

Mounted upon one of the arms 14 of the armature, is the pivotal governor bar 23, held in place by means of the screw 24, and carrying at its longer free end a governor weight 25. The shorter end of the bar 23 is connected by means of a contractile coil spring 26, with an adjusting screw 27, the latter mounted in a post 28 carried by one of the pole pieces 16. This structure is of such a character that when the nut 29 is screwed upon the adjusting rod 27, the spring 26 is put under greater tension. I provide a slot 30, about midway of the length of the longer arm of the bar 23, and in this slot is adjustably mounted the brush holder 31, carrying at its inner end a graphite brush 33 in position for contact with the face of the circuit interrupter 18.

The brush is of the usual type and is provided with the usual adjusting screw 32 to take up for the wear of the brush upon the face of the circuit interrupter.

As hitherto indicated, the circuit interrupter 18 is conical and slidable up and down upon the sleeve portion 5 of the central supporting block. The circuit interrupter is normally held in its uppermost position by means of the spring 21. The tendency of the governor spring 26, is to press the brush 31 against the conical face of this circuit interrupter, but with the ring armature 11 rapidly revolving, the centrifugal force has a tendency to throw the governor ball 25 with the bar 23, outward, and thus throw the brush 31 away from the circuit interrupter. This centrifugal tendency is restrained however, by the governor spring 26.

Figure 2:
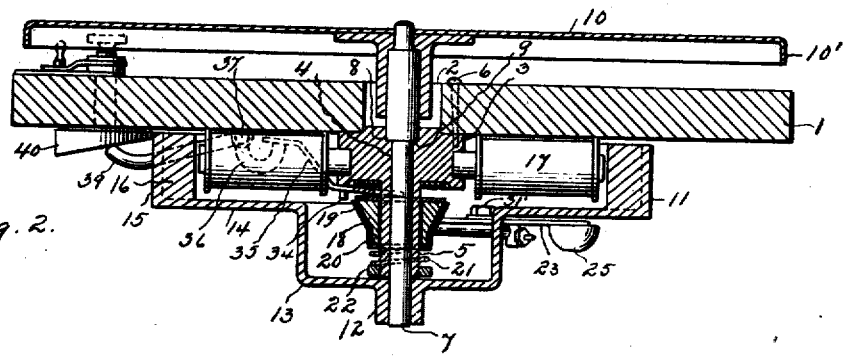
Fig. 2, is a central cross-section of the motor and turntable.

I determine the point at which the brush leaves the circuit interrupter by means of the speed of rotation of the ring. In practice the turntable of a talking machine should rotate at a rate of about 78 R. P. M. The tension of the spring 26 can be so regulated that when the armature 11 reaches a rotational rate approximately of 78 R. P. M., the brush will be at the critical point of just leaving the face of the circuit interrupter through the influence of the governor ball 25, and bar 23. This may be termed a factory regulation. If, however, in actual use it is desired to vary the rate of rotation, this can be done by retarding or accelerating the point at which the brush shall leave the face of the circuit interrupter. In order to accomplish this, I provide means by which the circuit interrupter 18 may be raised and lowered upon the sleeve extension 5, as follows: Upon the block 3, is located the pin 34, upon which is pivoted, for vertical oscillation, the forked lever 35, the forks of which extend around the upper end of the sleeve 5, and between the upper end of the circuit interrupter and the body of the block 3. The opposite free end of the lever 35 is bent upwardly toward the under side of the motor board 1, as shown in dotted lines in Fig. 2, where its extremity is in position for engagement by the curved arm 36 of the rock-lever 37, the latter held in position by means of the keepers 38. The free end of this rock-lever extends laterally, as shown at 39, for engagement with a cam 40. This cam is provided with a thumb adjustment 41, and an index pointer 42. From this structure, it will be readily understood that the rotation of the cam 40 through the thumb piece 41 will oscillate the rock-lever 37 and simultaneously depress the lever 35 and with it the circuit interrupter 18, against the spring 21. This will cause the brush 31 to ride at a higher point upon the face of the circuit interrupter; this, of course, will place the spring 26 under a greater tension, inasmuch as it will push the bar 23 farther away from the center of rotation, and it will consequently require a greater rate of rotation in the armature 11, to overcome the higher tension in the spring 26, thus caused, so that the governor ball 25 may exert sufficient centrifugal influence to pull the brush 31 away from the face of the circuit interrupter. To decrease the rate of rotation of the armature 11, and consequently the rate of rotation on the turntable 10, it is only necessary to swing the cam 40 in the opposite direction so that the lever 35 may release the circuit interrupter 18 and thus permit the spring 21 to push said circuit interrupter upwardly and thereby permit the brush 31 to ride upon a smaller diameter of the cone-shaped circuit interrupter. Under these circumstances, it is obvious that the spring 26, being under considerably less tension, will permit the governor ball 25 to fly away from the center of rotation at a much lower speed.

The wiring diagram is illustrated in Fig. 3. The source of electric current, as 44, may be a battery, or the electric light supply, or any desired or preferred source of current. It is connected to the two binding screws 45—46. The wiring of the device is as follows: From the post 45, wire 47 is led to the plate 48, which forms a part of the combined switch and brake mechanism. From the plate 48, the circuit continues through the pivotal switch plate 49, to the contact plate 50, thence by the wire 51 in series through the several magnets 17, and as shown in Fig. 3, the circuit is grounded through the block 3, and since the mandrel or shaft 7 is in metallic contact with the block 3, the circuit may continue through the mandrel 7, through the hub 12, cup 13, arm 14, and thence through the bar 23 to the brush 31, and thence intermittently to the circuit interrupter as the metallic parts thereof pass in contact with the brush. The metallic part of the circuit interrupter itself may be connected directly to the binding screw 46, but as shown in the drawings, the last one of the magnets 17 is also included in this last part or fractional circuit 52. It is obvious, however, that the grounding of the circuit through the block 3 might be made at any point in the circuit or between any pair of adjacent magnets.

The brake and switch shown in Fig. 3, are of the usual type of brake mechanism with the switch added. The plate 48 is rigidly secured to the motor board 1, and is provided with an upstanding projection 53. Pivoted upon this plate is the rectangular switch lever 54, having a rearward and upward projection 55, and the arc-shaped slotted portion 56, carrying at its free end an upright projection 57, in which is secured the brake shoe 58, for engagement with the flange 10' of the turntable 10. The upright stationary projection 53 is connected with the swinging upright projection 55, by means of a contractile coil spring 59.

The position of the parts, as shown, is such that the circuit is completed through the wire 47, and the wire 51, through the contact piece 50, and the lever 54. When, however, the lever 54 is swung into braking position, the circuit is broken between the contact piece 50 and the lever 54. This serves effectually to cut off the electric current and thus stop the mechanism.

In adjusting the brush 31 in the slot 30, by means of the small set bolt 31', I am able to so locate the contact of the brush 33 with the conical face of the circuit interrupter 18, as to cause said brush to be just leaving a metallic portion of said circuit interrupter as the cores of the magnets 17 are immediately adjacent to the pole pieces 16 of the armature, this, of course, breaks the electric circuit through the magnets 17, and as they are thus deënergized the magnetic attraction offers no resistance to the further rotation of the armature, but the brush 33 will again pass upon a metallic strip of the circuit interrupter as the corresponding pole pieces 16 again come into the field of attraction of the magnet cores, and thus, the armature 11 is kept in rotation by a series of magnetic "pulls". By the means of adjustment above described, I am able to very accurately regulate the number of revolutions per minute of the armature, and since the magnetic pulls occur with such frequency and strength, the variation of the pressure of the stylus needle upon the surface of a record disk, offers no serious frictional drag upon the rotation of the armature.

It will thus be seen that I have accomplished all of the results set out by a structure at once simple and easy of manipulation without liability to disorder under ordinary conditions.

I claim:

1. In a talking machine motor, the combination of a stationary field magnet and a rotating induction armature, with a circuit interrupter in circuit with said magnet, a brush carried by said armature adapted to bear upon said circuit interrupter, and centrifugal means carried by said armature adapted upon a predetermined rate of revolution thereof to separate said brush from said circuit interrupter and manually operated means for varying such point of separation.

2. In an electric talking machine motor, the combination of a stationary magnet and a rotating induction armature, a circuit interrupter, a centrifugal governor carried by said armature, a brush carried by said governor adapted to bear upon said circuit interrupter and to break contact therewith upon a predetermined rate of revolution of said armature, means for varying the point of such break, a source of electric supply, and a circuit including said magnets, circuit interrupter, brush and electric supply.

3. In a talking machine motor, the combination of a polygonal supporting block, having a sleeve bearing projecting downwardly and centrally therefrom, a circuit interrupter slidably mounted upon said sleeve bearing, a plurality of magnets projecting radially from the faces of said block, a mandrel mounted to rotate in said bearing, an induction armature mounted to rotate with said mandrel with the poles thereof in close proximity to the projecting cores of said magnets, a weighted spring pressed lever pivoted to said armature and adapted to swing away from its center of rotation at a predetermined rate of rotation thereof, a brush adapted to bear upon said circuit interrupter carried by said lever, means for manually shifting said circuit interrupter vertically to vary the point of separation of said brush from said circuit interrupter, and an electric circuit including said magnets, brush and circuit interrupter.

4. In a talking machine motor, the combination of a plurality of field magnets, an induction armature having a plurality of poles adapted to revolve in close proximity to the cores of said field magnets, a circuit interrupter associated with said field magnets, a brush carried by said armature adapted to bear upon said circuit interrupter, and centrifugal means carried by said armature adapted upon a predetermined rate of revolution thereof to separate said brush from said circuit interrupter, and manually operated means for shifting said circuit interrupter to vary the point of such separation.

5. In a talking machine motor, the combination of a centrally apertured polygonal supporting block having a sleeve bearing projecting centrally and downwardly therefrom, a circuit interrupter slidably mounted upon said sleeve bearing, a plurality of magnets projecting radially from the faces of said block, a record supporting mandrel mounted to rotate in said bearing, an induction armature having a plurality of inwardly directed pole pieces mounted to rotate with said mandrel with the poles thereof in close proximity to the projecting cores of said magnets, a weighted lever pivoted to said armature and tending to swing away from its center of rotation at a predetermined rate of rotation of said armature, a spring connected to said lever for resisting said tendency, a collector brush adjustably secured to said lever and adapted to bear upon said circuit interrupter, means for vertically shifting said circuit interrupter to vary the point at which said brush will break contact with said circuit interrupter, and an electric circuit including said magnets, brush and circuit interrupter.

6. In a talking machine motor, the combination of a polygonal, centrally apertured supporting block having a sleeve bearing projecting therefrom, a cone-shaped circuit interrupter mounted upon said sleeve bearing, a plurality of magnets projecting radially from the faces of said block, a mandrel mounted to rotate in said bearing, an induction armature mounted to rotate with said mandrel with the poles thereof in close proximity to the projecting cores of said magnets, a lever pivotally mounted upon said armature and adapted to swing radially from its center of rotation at a predetermined rate of rotation of said armature, a brush adjustably secured upon said lever and adapted to bear upon said circuit interrupter, means for vertically shifting said circuit interrupter to vary the point at which such brush will break contact with said circuit interrupter, and an electric circuit including said magnets, brush and circuit interrupter.

7. In a talking machine motor, the combination of a polygonal, centrally apertured supporting block having a sleeve bearing projecting centrally and downwardly therefrom, a cone-shaped circuit interrupter mounted upon said sleeve bearing and provided with a plurality of metallic faces upon its cone surface, a mandrel mounted to rotate in said bearing, an induction armature provided with a plurality of inwardly directed pole pieces, said armature being mounted to rotate with said mandrel with its poles in close proximity with the poles of said magnets, a weighted spring pressed lever pivoted upon said armature and adapted to swing radially away from its center of rotation at a predetermined rate of rotation thereof, a brush adapted to bear upon said circuit interrupter, said brush being adjustably mounted upon said lever, means for manually raising and lowering said circuit interrupter to vary the point at which said lever will swing said brush free from said circuit interrupter, and an electric circuit including said magnets, brush and circuit interrupter.

8. In a talking machine motor, the combination of a polygonal, centrally apertured supporting block having a sleeve bearing projecting centrally and downwardly therefrom, a cone-shaped circuit interrupter mounted upon said sleeve bearing for vertical reciprocation, a plurality of magnets projecting radially from the faces of said block, a mandrel mounted to rotate in said bearing, an armature secured to said mandrel, said armature having a plurality of inwardly directed pole pieces adapted to rotate in close proximity with the projected poles of said magnets, a lever pivoted upon said armature to swing toward and away from said circuit interrupter, a spring connected to said lever and armature to give said lever a normal bias toward said circuit interrupter, a brush adapted to bear upon said circuit interrupter, said brush being adjustably secured to said lever, manually operated means for vertically reciprocating said circuit interrupter to vary the bias of said lever, and an electric circuit including said magnets, brush and circuit interrupter.

9. In a talking machine motor, the combination of a set of radially directed stationary field magnets, a cone-shaped circuit interrupter centrally mounted to reciprocate relative to said magnets, an induction armature having a plurality of inwardly directed pole pieces mounted to rotate with said pole pieces in close proximity to the cores of said radially directed field magnets, a combined centrifugal governor and brush carried by said armature and adapted to bear upon said circuit interrupter at a normal rate of rotation of said armature and to swing away from said circuit interrupter at a predetermined maximum rate of rotation of said armature, manually operated means for reciprocating said circuit interrupter to vary the point of break with brush, and an electric circuit including said magnets, brush and circuit interrupter.

10. In a talking machine motor, the combination of a plurality of radially directed, centrally supported field magnets, a sliding circuit interrupter mounted to reciprocate in the axis of said magnets, an induction armature having a plurality of inwardly directed pole pieces adapted to rotate with said pole pieces in close proximity to the radial poles of said projecting magnets, a combined governor and brush mounted upon said armature said brush adapted to bear upon the surface of said circuit interrupter, said governor adapted to break said contact between said brush and circuit interrupter upon a predetermined rate of rotation of said armature, means for manually reciprocating said circuit interrupter to vary the point of such break, and an electric circuit including said magnets, brush and circuit interrupter.

In testimony whereof, I have hereunto set my hand and affixed my seal this 16 day of November, 1915.

HOWARD A. SELAH.

Copies of this patent may be obtained for five cents each, by addressing the "Commissioner of Patents, Washington, D. C."